INVENTOR.
CLAUDE P. BATTAREL

BY Robert S. Topetzer

ATTORNEY

Dec. 3, 1968 C. P. BATTAREL 3,414,720

PULSE RATE MULTIPLIER

Filed April 27, 1964 2 Sheets-Sheet 2

INVENTOR.
CLAUDE P. BATTAREL
BY Robert S. Topercer
ATTORNEY 3,414,720

PULSE RATE MULTIPLIER

Claude P. Battarel, Newtonville, Mass., assignor to Laboratory for Electronics, Inc., Boston, Mass., a corporation of Delaware Filed Apr. 27, 1964, Ser. No. 362,818
5 Claims. (Cl. 235—164)

This invention relates generally to electronic computing machines and more particularly it is concerned with multiplier logic for digital-operational type computing machines.

Digital-operational computer is a term that has gained currency in connection with a relatively recent data processing development which borrows from both the analog and digital modes of operation. As is well known to those skilled in the art an analog computer operates upon continuous variables in real time and has the advantage of being relatively simple to program and to adapt to a variety of specialized applications. However the accuracy and speed of an analog computer are not at all comparable to what is attainable with digital computers. The reason, of course, is that in a digital computer, information is handled in the form of discrete variables so that accuracy is limited only by machine size and complexity. A drawback of most digital computers, however, is that they do not operate in real time and also they usually require a relatively elaborate programming effort. Then too, complicated systems of equations, especially differential equations are soluble only at a considerable sacrifice in speed which makes real time operation difficult to achieve.

Digital operational techniques are ideally suited for many special equations solving applications including differential equations. These techniques are based on the use of serial pulse trains in a manner analogous to that used for manipulating analog signals, namely in a continuous flow system. This is described more in detail in an article by J. Bernard Madeira in the November/December, 1963 issue of "Data Processing for Science/Engineering". The present invention is directed to a novel form of basic building block for such a system, namely logic circuitry for impressing a multiplier factor upon a serial pulse train.

As disclosed in U.S. Patent No. 2,913,179 issued to Bernard M. Gordon on November 17, 1959 and U.S. Patent No. 2,910,237 issued to Maurice A. Meyer et al, October 27, 1959, both of which are assigned to the same assignee as the present invention, suitable logic to perform this multiplying operation can be arrived at by combining certain functions of a binary counting register and a set of coincident gates. These references disclose in particular that the function of the counter is to provide signals indicative of the number of serial pulses that have occurred and that the function of the gates is to selectively pass pulses derived from the ZERO to ONE transitions of the counter in accordance with the sense of a parallel signal input representing the multiplier factor. These ZERO to ONE transitions occur once for each serial pulse input and in order to detect them special requirements are imposed on the design of the counter. Such requirements are avoided according to the present invention by detecting the least significant ONE bit standing in the counter after each serial input pulse has been entered. This, it can be shown, is the logical equivalent of detecting the ZERO to ONE transitions.

The object of the present invention is to provide simplified multiplier logic circuitry for digital operational applications.

A more specific object is to provide more reliable and less costly circuitry of the above-mentioned character.

The novel features of this invention together with further objects and advantages will become more readily apparent from the following detailed description and the drawing to which it refers:

Figure 1:
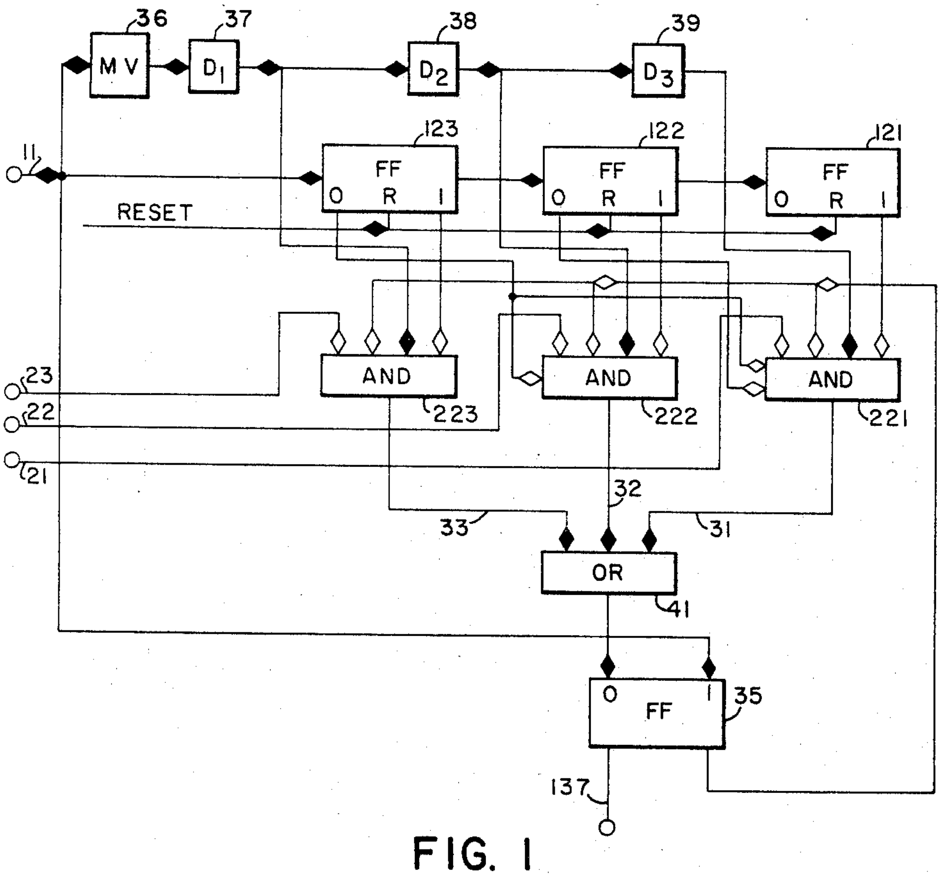
FIG. 1 is a block diagram of the circuitry according to one embodiment of the invention.

With reference first to FIG. 1, it will be observed that the numerals 21, 22, 23, refer to a set of parallel input lines for binary signals in the form of D.C. levels and that the numeral 11 designates an input line for serial pulses to be operated upon by the binary signals. Serial line 11 is coupled to the input of a binary counter which has three stages 121–123 corresponding to the three input lines for parallel data signals 21–23. A counter of only three stages has been shown for the sake of simplicity, but it should be understood that the number of input lines used to convey the parallel data may (and usually will) be substantially greater, necessitating a correspondingly greater number of counter stages.

As shown, each stage of the counter has a ZERO output and a ONE output on which levels are selectively raised to represent the individual digits of the number of serial pulses that have been counted. Between stages there are provided the usual carry lines for pulses which are generated when a carry to the next higher order stage is required to advance the count. There is also a reset line associated with each counter stage so that the existing count can be cleared by means of a single pulse, thereby conditioning the counter to begin counting over again from ZERO.

Coupled to the ONE output line of each counter stage is a logic element which has input circuits and one output line. These logic elements are designated 221–223 to signify their association with the respective counter stages 121–123. In addition to the signals from the counter stages, the logic elements also receive parallel binary signals by way of lines 21–23 respectively, sensing pulses initiated by a multivibrator 36, and a signal from a bistable element 35 when it is standing in the ONE state all of which will be explained more fully hereinafter.

Figure 2:
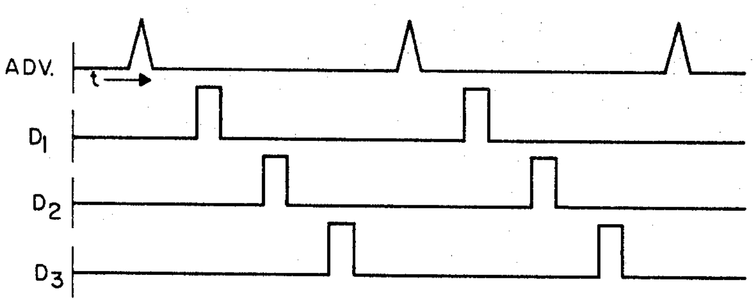
FIG. 2 is a timing diagram illustrating the timing relation of certain of the pulses generated in the circuitry of FIG. 1.

The timing relation of the sensing pulses $D_1$, $D_2$, $D_3$, is illustrated in FIG. 2, where it will be observed that these pulses occur sequentially in the intervals between the times that the serial input pulses occur. This timing relation may be realized in a variety of ways, and by way of example there has been shown in combination with the multivibrator 36 of FIG. 1, a group of delay elements 37, 38, and 39 arranged in cascade. Multivibrator 36 has its input coupled to serial line 11 and its output connected to the delay elements 37, 38, 39, as shown, so that in response to each serial pulse on line 11, multivibrator 36 generates a sensing pulse which traverses the delay lines one by one. As the pulse proceeds from one delay element to the other, it undergoes a successively increased amount of delay which has the effect of separating the responses of the delay elements in point of time. In other words, the times of occurrence of the sensing pulses as they appear at logic elements 221–223 are appropriately staggered.

The output lines 31–33 from the AND logic elements are coupled through a buffer 41 (labelled OR in FIG. 1) to the ZERO input of bistable element 35 and serial line 11 is coupled directly to its ONE input. As will become apparent from the description of the operation which follows, the ZERO output of this element serves to provide output signals at a rate which corresponds to the product of the rate at which the pulses appear on serial line 11 and the number represented in binary form by the signals on parallel lines 21–23.

For purposes of explaining the operation of the circuitry, it will be assumed that the two most significant lines 22 and 23, are carrying ONE signals to signify the number three quarters as the multiplier. Also it will be assumed that the counter stands at ZERO initially. Accordingly, when the first of the serial pulses appears on line 11, counter stage 123, the least significant of the counter stages, is set to ONE as is bistable element 35. Consequently, logic element 223 is enabled to respond to a sensing pulse from delay element 37. When this sensing pulse appears, it is passed through logic element 223 and buffer 41 to the ZERO input of bistable element 35, resetting that element to ZERO and producing an output signal on its associated output line 137. With bistable element 35 in the ZERO state, logic elements 221, 222 then become disabled. The effect of this is to prevent any additional pulses from reaching the bistable element 35 until after the second serial pulse has occurred on line 11.

Upon the occurrence of the second serial pulse, counter stage 123 is switched to the ZERO state and counter stage 122 is switched to the ONE state. Contemporaneously, bistable element 35 is switched to the ONE state. When the first of the sensing pulses appears at logic element 223, it wi l be unable to propogate further because of the fact that counter stage 123 is not in the proper state to condition logic element 223 to pass this sensing pulse. The converse, however, is true with respect to logic element 222 whose associated counter stage 122 is now standing in the ONE state with the result that the second sensing pulse is effectively passed on to the ZERO input of bistable element 35, thereby producing a second output signal on line 127. With bistable element 35 in the ZERO state, logic elements 221 and 223 become disabled which again prevents any further sensing pulses from inducing a response. In other words, one and only one output signal is produced. Upon the occurrence of the third serial input pulse, counter stage 123 is switched back to the ONE state enabling logic element 223 to pass a sensing pulse from delay element 37 once again. This causes bistable element 35 to produce still another output signal on the line 137 upon its return to ZERO. No output signal is produced in response to the second sensing pulse even though counter stage 122 remains standing in the ONE state because of the inhibiting effect of bitsable element 35 on all but the first of the sensing pulses to be passed. That is to say, the circuitry according to the invention is adapated to respond only to the least significant of the ONE bits standing in the counter if there is a corresponding ONE bit present on the parallel line associated therewith. This, it will be seen, is equivalent to the criteria disclosed in the aforementioned Patent No. 2,910,237 of selectively detecting the ZERO to ONE transitions which occur uniquely in the counter, once per count increment, and for matching these transitions according to the sense of the parallel input signals.

To complete the explanation of the operation of the circuitry under the assumed conditions, it should suffice hereafter merely to specify the output signals that are produced upon the occurrence of the fourth, fifth, sixth, seventh and eighth serial pulses. In response to each of the fifth, sixth and seventh serial pulses an output signal is produced, but no output signal is produced in response to the fourth pulse. Likewise upon the occurrence of the eighth serial pulse no output signal is produced because the counter is returned to zero and none of the logic elements 221–223 are conditioned. In other words, a total of six output signals are produced for each group of eight serial input pulses corresponding to a multiplication factor of three quarters. As it should, this agrees with the multiplier number which the parallel binary signals were assumed to represent.

Figure 3:
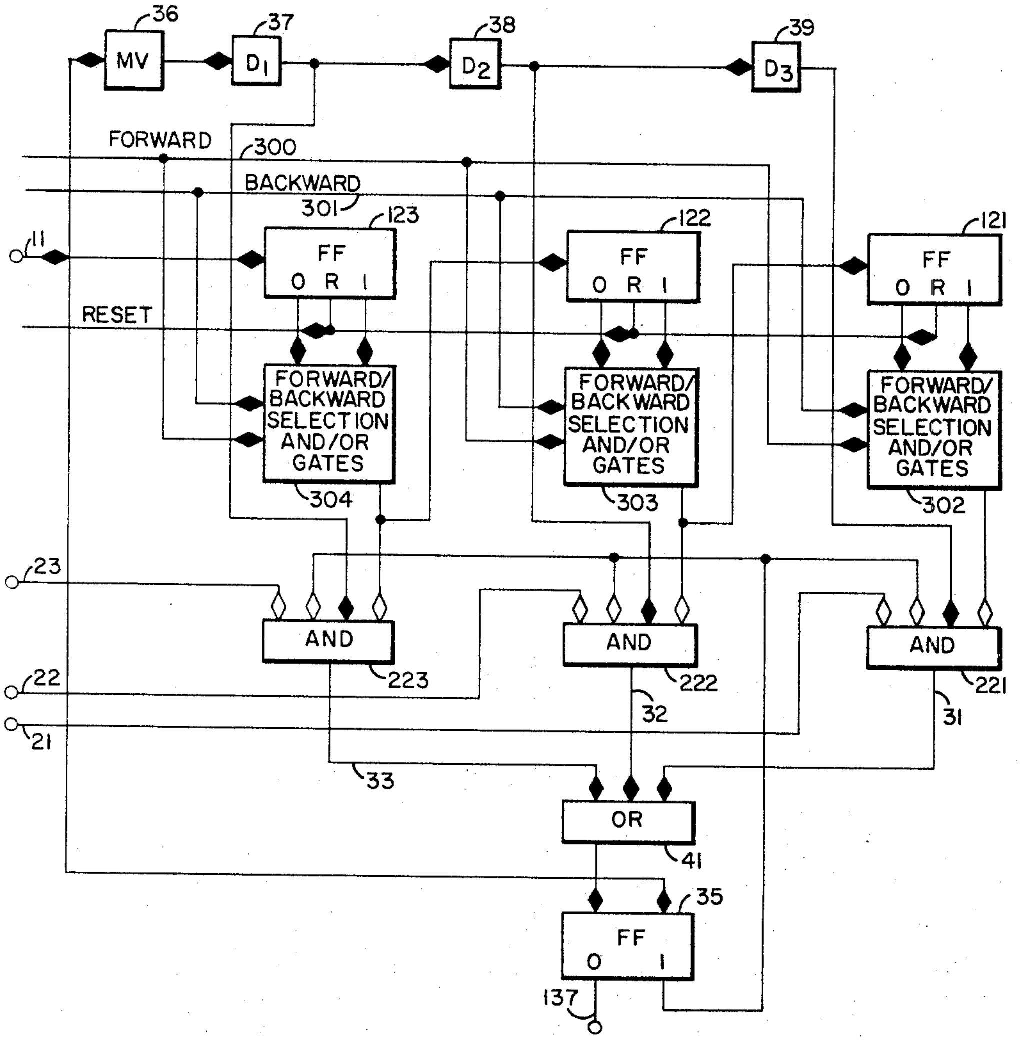
FIG. 3 is a block diagram of the circuitry according to a second embodiment of the invention.

Referring now to FIG. 3, it may be seen that the embodiment of the invention shown in FIG. 1 may easily be modified so that the least significant ONE bit standing in the counter may be detected after a number of addition and subtraction operations. The various elements which are common to FIGS. 1 and 3 have been similarly numbered. In FIG. 3 the three stages 121, 122, 123 of the binary counter are arranged so as to count forward or backward. To accomplish this end, conventional forward and backward lines 300, 301 are provided. These lines are connected to switching matrices 302, 303, 304 (here labelled forward/backward selection AND/OR gates). Each of the switching matrices 302, 303, 304 may, for example, consist of a pair of AND gates feeding an OR gate, the output of which is connected to respective ones of the AND gates 221, 222, 223 and the following stages 121, 122 of the counter as shown. One of the AND gates in each of the switching matrices 302, 303, 304 is enabled by a signal on the forward line 300 and the other AND gate is enabled by a signal on the backward line 301. Each of the AND gates enabled by the forward line 300 is connected to the ONE output of each stage 121, 122, 123. Each of the AND gates enabled by the backward line 301 is connected to the ZERO output of each stage 121, 122, 123. Thus, it may be seen that the state of the forward line 300 and the backward line 301 determines which of the AND gates passes a signal and that the remainder of the illustrated circuitry operates in the same manner as described in connection with FIGS. 1 and 2.

Alythough the invention has been described in terms of particular preferred embodiments, those skilled in the art will recognize that various alternatives and modifications within the spirit and scope of the invention are possible. Therefore, the invention should not be deemed to be limited to the details of what has been described herein by way of illustration but rather it should be deemed to be limited only by the scope of the appended claims.

What is claimed is:

1. Multiplier logic circuitry for operation with serial data pulses and parallel binary signals, said circuitry comprising:

(a) a binary counter to count the individual data pulses, said counter having a plurality of stages corresponding to the orders of said binary signals and each of said stages being adapted to assume a selected condition to represent a digit of the number of data pulses counted;

(b) means to provide a plurality of sensing pulses occurring in a timed sequence during each interval defined by a pair of successive data pulses (c) means to determine the numerical relation between each of the parallel signals and a corresponding counter stage, said relations being determined sequentially in response to said sensing pulses; and (d) means to selectively produce an output signal in response to the first of said parallel signals and corresponding stages that exhibit a predetermined relation.

2. Multiplier logic circuitry for operation with serial data pulses and parallel binary signals, said circuitry comprising:

(a) a binary counter to count the individual data pulses, said counter having a plurality of stages and each of said stages being adapted to produce a signal having an order which corresponds to one of the orders of said parallel signals;

(b) means to generate a sequence of sensing signals during each interval defined by successive data pulses;

(c) means to produce an arithmetic output signal as an AND function of each sensing signal and a corresponding one of said parallel signals and counter signals; and, (d) means to suppress the production of more than one of said arithmetic output signals during each said interval.

3. Multiplier logic circuitry for operation with serial data pulses and parallel data signals comprising:

(a) a counter to count the individual data pulses, said counter having a plurality of stages and each of said stages producing a signal having an order which corresponds to one of the orders of said parallel signals;

(b) means to produce a sequence of sensing signals during each interval defined by successive data pulses;

(c) a control element which is enabled to produce a conditioning signal in response to each said data pulse and is disabled from producing a said conditioning signal in response to an arithmetic output signal; and, (d) a logic element conditioned by said control element for producing an arithmetic output signal as an AND function of each sensing signal and a corresponding one of said parallel signals and counter signals.

4. Multiplier logic circuitry for operation with serial data pulses on a serial input line and parallel data signals on parallel input lines, said circuitry comprising:

(a) a counter to count individual serial pulses, said counter having a plurality of stages and each of said stages having an output line which carries a digit signal representative of a digit of the number of serial pulses counted;

(b) means to generate, on separate output lines, sensing pulses for sensing the count in said counter stage by stage during each interval defined by successive serial pulses;

(c) a bistable element having a pair of input and output circuits, a first of said input circuits serving to switch the bistable element to a first state in response to a said data pulse and the second of said input lines serving to switch the bistable element to a second state in response to an arithmetic output signal, and a plurality of AND logic elements connecting to each of said output circuits to produce arithmetic output signals, each of said logic elements being associated with a corresponding one of said counting stages and each having four or more input circuits and an output circuit, said output circuit being coupled to said second input circuit of the bistable element and said input circuits being coupled respectively to the first output circuit of said bistable element, a selected one of said parallel input lines carrying said data signals, an unique one of the output lines from said pulse generating means the output line carrying digit signals from the corresponding counter stage, and the output lines carrying the inverse digit signals from all the preceding counter stages.

5. Multiplier logic circuitry for operation with serial data pulses on a serial input line and parallel data pulses on parallel input lines, said circuitry comprising:

(a) a binary counter to count the individual serial pulses, said counter having "$n$" stages and each of said stages having at least a ONE output;

(b) a pulse generator to generate "$n$" sensing pulses on separate lines during each interval defined by successive serial pulses;

(c) a bistable element having ONE and ZERO input and outputs, said ONE input being coupled to said serial pulse line;

(d) and a plurality of logic elements, each of which is associated with a corresponding one of said counting stages, each said logic elements having an output circuit coupled to the ZERO input of said bitsable element, a first input circuit coupled to the ONE output line from said bistable element, a second input circuit coupled to a selected one of said parallel lines, a third input circuit coupled to a selected one of the lines carrying said sensing pulses, a fourth input circuit coupled to the ONE output line from the corresponding counter stage, and a fifth input circuit coupled to the ZERO output line from all preceding counter stages.

References Cited

UNITED STATES PATENTS

| | | | |
|---|---|---|---|
| 2,951,986 | 9/1960 | Gordon | 324—79 |
| 3,052,412 | 9/1962 | Baskin | 235—164 |
| 3,126,476 | 3/1964 | Pariser, et al. | 235—164 |

MALCOLM A. MORRISON, *Primary Examiner.*

D. H. MALZHAN, *Assistant Examiner.*